April 24, 1934.  A. E. CHURCH  1,956,272
CHUCK ACTUATING MECHANISM
Filed April 14, 1932   2 Sheets-Sheet 1
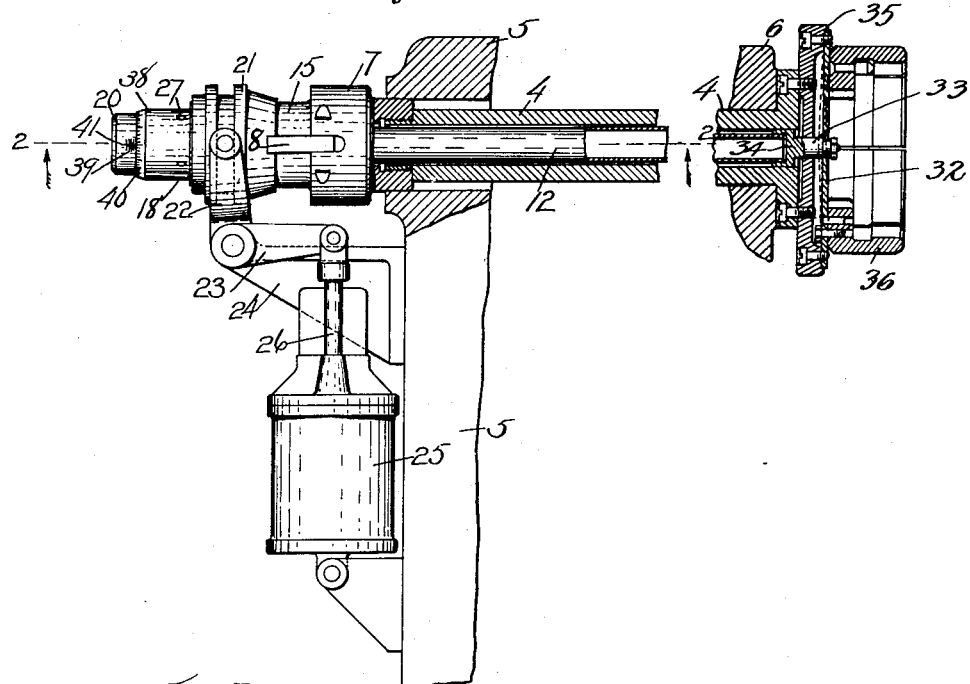
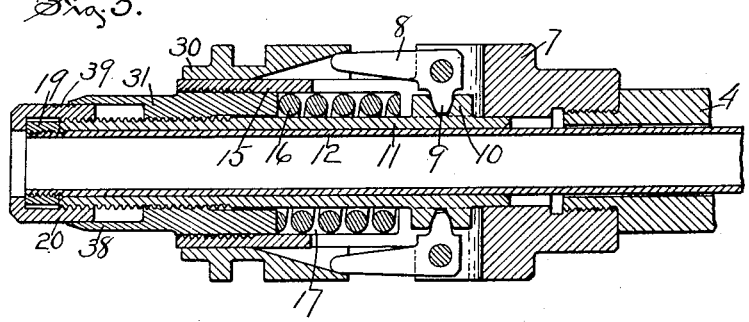
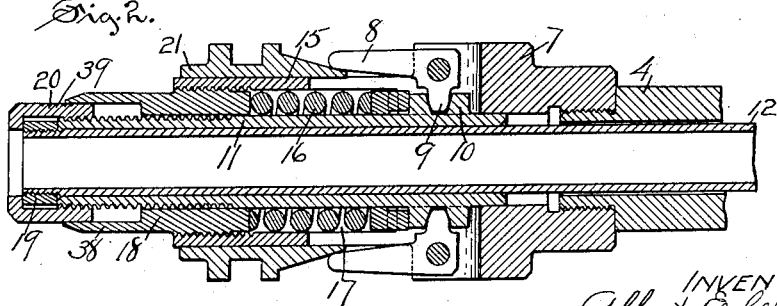

April 24, 1934. A. E. CHURCH 1,956,272
CHUCK ACTUATING MECHANISM
Filed April 14, 1932 2 Sheets-Sheet 2
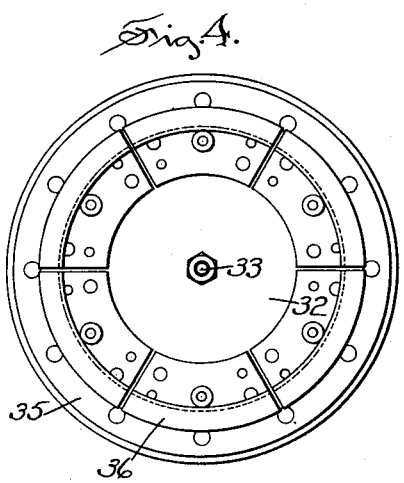
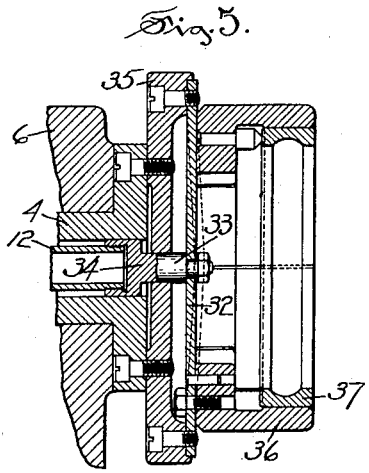
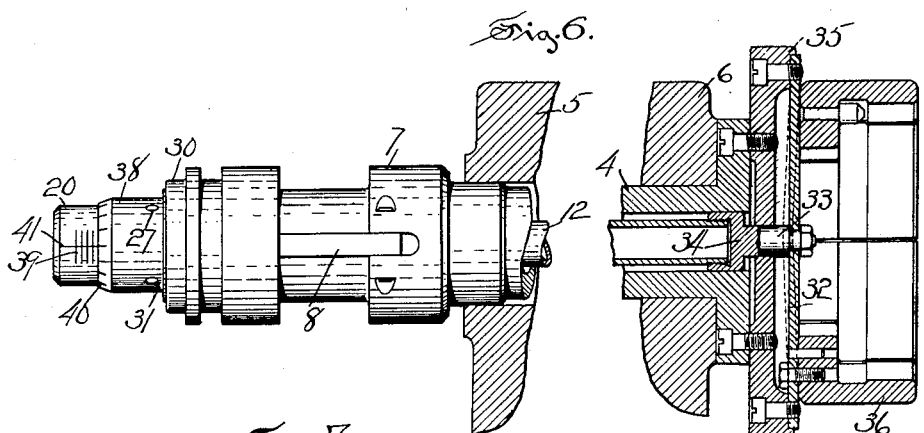
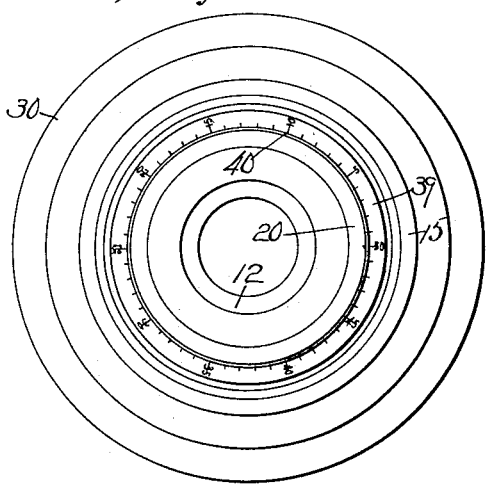
INVENTOR
Albert E. Church
by
Arthur J. Jenkins,
ATTORNEY Patented Apr. 24, 1934

1,956,272

UNITED STATES PATENT OFFICE 1,956,272

CHUCK ACTUATING MECHANISM

Albert E. Church, New Britain, Conn., assignor to The Union Manufacturing Company, New Britain, Conn., a corporation of Connecticut Application April 14, 1932, Serial No. 605,187

6 Claims. (Cl. 279—46)

My invention relates to a type of mechanism which is employed for holding pieces or rods of material for the formation of various articles therefrom, and an object of my invention, among others, is to provide a simple mechanism of this type that may be readily adapted to the operation of chucks for holding articles in different ways; and a further object of my invention is to provide a mechanism of this type by means of which a constant pressure may be applied to articles to hold them and which pressure may be varied to suit different conditions; and a further object of the invention is to provide a chuck that shall be simple in construction and particularly efficient in operation.

One form of a chuck embodying my invention and in the construction and use of which the objects herein set out, as well as others, may be attained is illustrated in the accompanying drawings, in which:

Figure 1 is a partial side view and a partial sectional view of a portion of a machine embodying my invention.

Figure 2 is a view on enlarged scale of the rear end of a chuck spindle cut in axial section on a plane denoted by the dotted line 2—2 of Figure 1 to illustrate my invention.

Figure 3 is a view similar to Figure 2, but illustrating my invention as applied to the operation of the chuck as shown in Figure 5.

Figure 4 is a face view of a diaphragm chuck.

Figure 5 is a view in axial section through the forward end of said chuck illustrating the use of my improved mechanism in connection with the arrangement shown in Fig. 3.

Figure 6 is a view similar to Figure 5, but in addition showing the rear end of the chuck spindle, the center of which is broken out.

Figure 7 is a view on enlarged scale looking at the back end of a chuck spindle.

In the accompanying drawings only so much of a machine as is necessary to a clear understanding of my invention is illustrated herein, the showing being confined to the chuck spindle with its chuck and the means for operating the latter, the means for rotating the spindle and for feeding the material through said spindle being omitted.

The spindle 4 is mounted in any ordinary manner in frame parts 5 and 6 and any suitable means for rotating the spindle may be employed, although my invention is not necessarily limited to use in connection with a rotating spindle. The spindle is secured at its rear end to an adapter 7 rotatably mounted in the frame member 5, said adapter being slotted to receive actuating levers 8 pivotally mounted therein, said levers each having a tooth 9 entering into a notch in a lug 10 projecting laterally from the side of an actuating sleeve 11 supporting the rear end of an actuating tube 12 which extends out at the rear end of the sleeve and which also extends forward through the spindle 4 to the forward end thereof.

A housing 15 extends rearwardly from the adapter 7 and contains a spring 16 supported at its forward end within the chamber 17 in the housing, in the structure herein shown in Figure 2 a washer being placed in the bottom of the housing to receive the spring and having lugs pressed against the lugs 10. At its rear end the spring thrusts against a spring tensioning support 18 screw threadedly secured within the mouth of the chamber 17 and slidably receiving the actuating sleeve 11, and as shown in Figure 2 of the drawings, said sleeve thrusting at its outer end against a bushing 19 secured, as by means of interengaging screw threads, to the end of the tube 12. A hood 20 is secured to the end of the sleeve 11 as by means of interengaging screw threads, said hood enclosing the bushing 19, the ends of the sleeve 11 and the tube 12.

An actuating wedge 21 is slidably mounted on the housing 15, this wedge being of the ordinary form common to machines of this type, its tapered portion engaging the levers 8 for the purpose of actuating them. An annular groove in the wedge receives studs projecting from opposite sides of the forked end 22 of a bell crank lever 23 pivotally mounted on a bracket 24 secured to the member 5 of the machine. This member 5 also supports an actuator which may be of any desired construction to impart a reciprocating movement to a connecting rod 26 projecting from a casing 25 or other device. As an example the casing may be a cylinder to contain a piston for reciprocating the rod 26 or it might be a housing for a winding comprising a portion of a solenoid for reciprocating said rod. The means for reciprocating the rod is immaterial to my invention.

The tensioning support 18 may be rotated in any ordinary manner for the purpose of tensioning the spring or releasing the tension thereof, as herein shown holes 27 being provided to receive a wrench.

Operation of the actuator may be effected manually or automatically, as may be desired. The proper tension having been obtained for the lugs 10 and consequently against the spring 16 the latter will operate normally against the sleeve 11 to force the tube 12 forwardly thereby closing the chuck jaws 36 of the chuck when it is desired to use the spring for this purpose, said jaws being secured to and projecting from a diaphragm 32 to be more fully hereinafter described. When it is desired to release the grip of said jaws upon a piece of work the actuator is operated to force the wedge 21 forwardly thereby actuating the levers 8 to compress the spring 16, thereby withdrawing its tension from the tube 12 and also moving said tube rearwardly to release the jaws from their grip upon the piece of work.

The structure of the device shown in Figures 3 and 5 is practically the same as that hereinbefore described, the only difference being that the spring tension of the diaphragm acts in the opposite direction to release the jaws and the spring 16 is compressed from the outer instead of the inner end to release the jaws. To effect this purpose the wedge 30 has a tapered recess to receive the actuating levers 8 and a spring tensioning support 31 is screw threadedly engaged with the collet actuating sleeve instead of with the housing 15 as in the device first hereinbefore described.

In the operation of this device the wedge 30 moves the arms 8 inwardly or toward each other to release the jaws 36 from their grip upon the outside of a piece of work and the spring 16 thrusting against the spring tensioning support 31 moves the actuating tube 12 rearwardly to close the chuck jaws against the outer surface of a piece of work as shown in Fig. 5.

In effecting a change in the machine from the device first herein described to that just mentioned a collet 28 is substituted for the collet 13, a wedge 30 is substituted for the wedge 21 and the spring tensioning support 31 is substituted for the support 18, the difference between the two supports being merely in the location of the thread on the inner part of the support to engage a thread on the sleeve 11 in one case and to thread said support on its outer surface to engage an interior thread in the housing 15 in the other case.

It will be noted that with the tension of the spring 16 set to impart a certain degree of force such force only will be applied to the collet and this force may be graduated to suit any condition with respect to articles held by the collet, that is, no excess pressure will be applied. Similarly, the capacity of the actuator will be so graduated that power beyond a certain limit will not be applied to the wedges 21 or 30, the actuator being stalled if power beyond its capacity is exerted. This eliminates any chance for injury to the parts affected by the actuator.

In both of the devices hereinbefore referred to loosening of the grip of the chuck jaws owing to wear of parts may be avoided and the grip of the jaws may be always maintained uniform by simply increasing the tension of the spring 16 to compensate for such loosened grip, and this in effect greatly prolongs the life and usefulness of the structure.

My improved chuck actuating mechanism is particularly applicable for use in the operation of diaphragm chucks, and as illustrated in the drawings herein, wherein the diaphragm 32 of the chuck hereinbefore referred to is operated by an actuating stud 33 projecting from the end of a cap 34 attached to the end of the actuating tube 12. The diaphragm is mounted in a chuck body 35 secured to the spindle 4, and the chuck jaws 36 are secured to and project from the diaphragm at substantially right angles thereto. In the structure herein shown these jaws comprise segments of a ring and are curved to fit and grasp a round object, as a ball ring 37 for a ball bearing. The diaphragm is composed of spring metal sufficient to enable it to be bowed at its central portion whereby the gripping portions of the jaws may be swung outwardly or inwardly, depending upon the direction in which the diaphragm is bowed, and the tightness of the grip of the jaws upon an article held thereby is determined by the tension of the diaphragm in this type of chuck as heretofore constructed.

In the use of these prior chucks, after a comparatively short period of time, the jaws become worn and the grip thereof gradually lessens until it is insufficient to securely hold the articles. This defect is increased from the fact that continued use also decreases the resiliency of the diaphragm so that the hold of the jaws becomes insufficient for practical purposes.

When this stage is reached such chucks become worthless and are discarded.

It is here remarked that the diaphragm is bowed by the action of the tube 12 to release the jaws, the resiliency of the diaphragm, when the bowing pressure is released, restoring such jaws to their clamping positions. In the illustration in Figs. 1, 2 and 6 herein the jaws are shown as arranged to grip an article as a ball bearing ring on its inner surface, but it will readily be seen that the jaws may be shaped to grip such article on its outer surface, as shown in Fig. 5, in which case the diaphragm being bowed in the opposite direction by operation of the tube 12 to release an article from that in which it was bowed to grip the article, and when the diaphragm returns to its normal position the article will be gripped by pressure of the jaws outwardly or inwardly as the case may be. This operation is readily understood by those skilled in the use of chucks of this type and for this reason a more detailed description is omitted herein, the structure of the chuck itself forming no part of my present invention.

While the force of the grip of the jaws has heretofore been determined by the degree of tension of the diaphragm, I propose, in order to maintain this force without variation to supplement it by making use of the spring 16, and by using the means for varying the tension of the spring as occasion may require. To this end I extend a flange 38 from the end of the spring tensioning supports 18 and 31 and create graduation grooves or marks 39 in the outer surface of the hood 20, these grooves or marks cooperating with the end of said flange to denote the amount of tension of the spring 16. As an example, if the spring tensioning support be turned enough to pass its edge from one to the other of said grooves or marks the tension of the spring will be increased or reduced to the amount of fifty pounds, depending upon the direction in which the support is turned.

Then again I provide a series of graduation marks 40 on the end of the flange 38 which cooperates with a graduation mark 41 extending lengthwise of the hood 20 on its outer surface. As herein illustrated a turn of the spring tensioning support a distance of one space between each of the graduations denotes an increase or decrease of said tension of the spring to the amount of one pound.

From this it will be seen that the tension of the spring may be very nicely determined and the pressure of the jaws 36 upon the articles held by them may be fixed within such limits as to prevent excess pressure to an extent to distort the article, a fault to be avoided for reasons hereinbefore mentioned.

In operation the tension of the diaphragm when new may be sufficient to provide the desired pressure of the jaws upon an article in moving from the dotted to the full line position shown in Figures 1 and 6, but if not the exact pressure desired may be obtained by means of the spring 16 which in such event will supply the small amount of added pressure required. Just as soon as the jaws become worn to any extent the spring tensioning supports 18 or 31, depending upon whether the grip of the jaws is upon the inside or outside of an article, will be employed to increase the tension of the spring 16 and thereby maintain the pressure of the jaws on the article uniform.

When the jaws become worn and the resiliency of the diaphragm becomes reduced to an extent to render the chuck useless under conditions heretofore prevailing and as hereinbefore explained, continued use of the chuck may be obtained by the use of my improved device, all that is required being to supply the spring tension before obtained from the diaphragm by making use of the spring 16.

This being done the spring 16 will now effect displacement of the diaphragm inwardly or outwardly, as the case may be, from its normal positions to the position shown in dotted lines in Figures 5 and 6 to cause the jaws to grip an article instead of merely permitting said diaphragm as previously to assume its normal position to effect such gripping action.

As an example of the operation in one instance where the jaws grip the article on the outside as shown in Fig. 5, if the chuck be equipped and operated as shown the diaphragm will be bowed outwardly from its midway or normal position by action of the tube 12 to release the chuck jaws and it will move inwardly under its own tension in assuming its normal position and thereby effect gripping action of the jaws, as illustrated in full and dotted lines in Figure 5, in this operation the wedge 30 and support 31 being employed. When the jaws become worn and the resiliency of the diaphragm becomes reduced, either or both, said diaphragm will now be bowed inwardly by action of the spring 16 to effect gripping action of the chuck jaws and the action of the wedge 30 will return the diaphragm to its normal position as before, thereby releasing the grip of the chuck jaws. The operation of the chuck may now be continued indefinitely and it will not be required to discard it as heretofore.

In accordance with the provisions of the patent statutes I have described the principles of operation of my invention, together with the device which I now consider to represent the best embodiment thereof; but I desire to have it understood that the device shown is only illustrative, and that the invention may be carried out by other means and applied to uses other than those above set out.

I claim:

1. The combination with a chuck including a chuck body, a diaphragm secured thereto and chuck jaws secured to said diaphragm, of an actuator member connected to operate said diaphragm in one direction, a spring connected with said actuator member to move it to operate said diaphragm in the opposite direction, and means for operating said actuator member in opposition to said spring.

2. The combination with a chuck including a chuck body, a diaphragm secured thereto and chuck jaws secured to said diaphragm, of an actuator member connected to operate said diaphragm in one direction, a spring connected with said actuator member to move it to operate said diaphragm in the opposite direction, and means for adjusting the tension of said spring.

3. The combination with a chuck including a chuck body, a diaphragm secured thereto and chuck jaws secured to said diaphragm to be moved to gripping positions by the resiliency thereof, of an actuator member connected to operate said diaphragm in one direction to release grip of said jaws, and means applicable to said actuator member to supplement the resiliency of said diaphragm to close said jaws.

4. The combination with a chuck including a chuck body, a diaphragm secured thereto and chuck jaws secured to said diaphragm to be moved to gripping positions by the resiliency thereof, of an actuator member to operate said diaphragm in one direction to release grip of said jaws, and a spring applicable to said actuator member to supplement the resiliency of said diaphragm to close said jaws.

5. The combination with a chuck including a chuck body, a diaphragm secured thereto and chuck jaws secured to said diaphragm to be moved to gripping positions by the resiliency thereof, of an actuator member to operate said diaphragm in one direction to release grip of said jaws, a spring applicable to said actuator to supplement the resiliency of said diaphragm to close said jaws, and means for adjusting the tension of said spring to compensate for weakening spring action in said diaphragm.

6. The combination with a chuck including a chuck body, a diaphragm secured thereto and chuck jaws secured to said diaphragm, of an actuator member connected to operate said diaphragm in one direction, a spring connected with said actuator member to move it to operate said diaphragm in the opposite direction, means for adjusting the tension of said spring, and means for determining the amount of adjustment required to supplement the spring action of the diaphragm.

ALBERT E. CHURCH.